United States Patent
Seo et al.

(10) Patent No.: US 9,162,595 B2
(45) Date of Patent: Oct. 20, 2015

(54) VEHICLE SEAT STRUCTURE

(75) Inventors: Min-Hong Seo, Gwangyang-si (KR);
Kang-Hwan Ahn, Gwangyang-si (KR);
Tae-Oh Lee, Gwangyang-si (KR)

(73) Assignee: POSCO, Pohang-si (KR)

( * ) Notice: Subject to any disclaimer, the term of this patent is extended or adjusted under 35 U.S.C. 154(b) by 289 days.

(21) Appl. No.: 13/824,411

(22) PCT Filed: Dec. 28, 2011

(86) PCT No.: PCT/KR2011/010187
§ 371 (c)(1),
(2), (4) Date: Mar. 18, 2013

(87) PCT Pub. No.: WO2012/091431
PCT Pub. Date: Jul. 5, 2012

(65) Prior Publication Data
US 2013/0187417 A1    Jul. 25, 2013

(30) Foreign Application Priority Data
Dec. 28, 2010 (KR) ........................ 10-2010-0137372

(51) Int. Cl.
*B60N 2/427* (2006.01)
*B60N 2/68* (2006.01)

(52) U.S. Cl.
CPC .............. *B60N 2/42709* (2013.01); *B60N 2/68* (2013.01); *B60N 2/682* (2013.01); *B60N 2/686* (2013.01)

(58) Field of Classification Search
CPC .... B60N 2/42709; B60N 2/686; B60N 2/682; B60N 2/68

USPC ................ 297/216.13, 216.14, 452.18, 452.2
See application file for complete search history.

(56) References Cited

U.S. PATENT DOCUMENTS

| | | | |
|---|---|---|---|
| 6,709,053 B1 * | 3/2004 | Humer et al. ............... | 297/216.1 |
| 6,739,673 B2 * | 5/2004 | Gupta et al. ............. | 297/452.65 |
| 7,540,563 B2 * | 6/2009 | Ogawa et al. ............. | 297/216.13 |
| 7,802,852 B2 * | 9/2010 | Siegrist et al. ........... | 297/452.18 |
| 8,132,862 B2 * | 3/2012 | Yamada et al. ............ | 297/452.2 |
| 2004/0227389 A1 * | 11/2004 | Yoshida .................... | 297/452.18 |
| 2005/0139297 A1 | 6/2005 | Shin et al. | |
| 2005/0206211 A1 | 9/2005 | Kim | |
| 2005/0269856 A1 | 12/2005 | Kim | |
| 2006/0103223 A1 * | 5/2006 | Nagayama et al. ...... | 297/452.18 |
| 2009/0127913 A1 * | 5/2009 | Beneker et al. .......... | 297/452.18 |
| 2010/0283282 A1 | 11/2010 | Jungert et al. | |

FOREIGN PATENT DOCUMENTS

| | | |
|---|---|---|
| CN | 2776749 | 5/2006 |
| EP | 0881116 A2 | 12/1998 |
| JP | 5-70343 | 9/1993 |
| JP | 2001-150996 | 6/2001 |
| JP | 2002034712 A | 2/2002 |

(Continued)

*Primary Examiner* — David R Dunn
*Assistant Examiner* — Tania Abraham
(74) *Attorney, Agent, or Firm* — The Webb Law Firm

(57) ABSTRACT

Provided is a vehicle seat structure that is lighter than a steel vehicle seat structure while providing the same function thereof. For this, the vehicle seat structure includes a seat cushion frame and a seat back frame connected to the seat cushion frame. At least one of components constituting the seat back frame and the seat cushion frame is formed of a magnesium plate produced through a rolling process and that has a texture.

12 Claims, 6 Drawing Sheets

(56) References Cited

FOREIGN PATENT DOCUMENTS

| | | |
|---|---|---|
| JP | 2005-193371 A | 7/2005 |
| JP | 2006-193010 | 7/2006 |
| JP | 2007-030583 | 2/2007 |
| JP | 2009-278224 | 11/2009 |
| JP | 2010-046162 | 3/2010 |
| JP | 2010-260537 A | 11/2010 |
| KR | 20050105803 A | 11/2005 |
| KR | 20050116183 A | 12/2005 |
| WO | WO 2009154909 A1 * | 12/2009 ............... B60N 2/68 |

* cited by examiner (a)

(b)

VEHICLE SEAT STRUCTURE

TECHNICAL FIELD

The present invention relates to a vehicle seat structure including a component formed of a magnesium plate, and more particularly, to a vehicle seat structure including a component formed of a magnesium plate to implement weight reduction and vibration resistance while providing the same function as a vehicle seat structure formed of steel.

BACKGROUND ART

Generally, vehicle seats are formed with standard structures so that various components for driver convenience can be selectively installed in vehicles without having to change vehicle seat frames. Vehicle seats are required to satisfy legal strength requirements, and since a driver operates a car while sitting on a vehicle seat, the vehicle seat is a part directly affecting ride quality.

Referring to FIG. 1, a vehicle seat (1) of the related art is manufactured by machining a steel plate at room temperature to form individual components and assembling the individual components by welding. Alternatively, as shown in FIG. 2, components are formed by die casting using magnesium, the density of which is about ⅕ the density of steel, and the components are assembled using bolts to form a light seat frame (2). The density of steel is about 7.8 g/cm³, while the density of magnesium is about 1.74 g/cm³.

Vehicle seats must satisfy strength requirements for safety. However, magnesium die-cast components are vulnerable to shearing due to the inevitable properties of magnesium, and impurities, such as oxides and die-casting defects such as pores, may weaken magnesium die-cast components. Thus, magnesium die-cast component joint portions are generally designed to be five or more times thicker than comparable steel component joint portions.

As a result, even in the case that the density of magnesium is about ⅕ the density of steel, a seat frame formed by die casting using magnesium may be only be lighter than a corresponding steel frame by about 2 kg or less, only resulting in about 10% or less weight reduction.

In addition, for example, when a vehicle travels over a speed bump or drives on an uneven road, the vehicle may be strongly impacted to make a cushioning frame vibrate vertically or a seat back frame vibrate backwards and forwards. If a vehicle is subjected to such strong vibrations for an extended period of time, magnesium die-cast components, the properties of which are not uniform, may be significantly damaged and cracked. Thus, magnesium die-cast components should be sufficiently thick to absorb external impacts.

In addition, when a driver operates a vehicle for a long time, the driver may be subjected to excessive vibrations through a seat frame and may become less alert due to accumulated fatigue, possibly resulting in an accident. In addition, excessive vibrations may significantly reduce driving comfort and stability and make it difficult to satisfy current customer demands for luxurious driving functions. Thus, the value of a vehicle may be reduced.

Although steel seat frames, which are widely used, are strong and safe, such steel seat frames easily transmit impacts or vibrations and have low vibration dampening abilities, due to their high spring constants. If vibration dampers are added to compensate for the low vibration dampening abilities of steel seat frames, the weight thereof may be increased.

An aspect of the present invention provides a vehicle seat component formed of a magnesium plate to remove limitations on a vehicle seat formed by magnesium die casting.

Another aspect of the present invention provides a vehicle seat structure that is lighter than a steel vehicle seat structure, while providing the same function thereof.

Another aspect of the present invention provides a vehicle seat structure that can provide user comfort by rapidly absorbing vibrations, generated in a vehicle-moving direction, and that is not excessively deformed even when a vehicle collides with another object, such that a user can be safely protected.

Another aspect of the present invention provides a vehicle seat structure including a magnesium plate component and an impact control component attached to the magnesium plate component to absorb or distribute impact energy while being deformed. Thus, according to the present invention, stable, light vehicle seats can be provided to a vehicle to allow for high fuel efficiency.

SUMMARY OF THE INVENTION

The present invention provides a vehicle seat structure as follows.

According to an aspect of the present invention, there is provided a vehicle seat structure including: a seat cushion frame; and a seat back frame connected to the seat cushion frame, wherein at least one component constituting the seat back frame and the seat cushion frame is formed of a magnesium plate.

The seat cushion frame may include a seat cushion bracket and a seat cushion panel, wherein the seat cushion bracket of the seat cushion frame may be formed of a magnesium plate. The seat cushion bracket may have a thickness of 2.0 mm to 4.0 mm.

The seat back frame may include a seat back side frame and a seat back member, wherein the seat back side frame may be formed of a magnesium plate. The seat back side frame may have a thickness of 1.5 mm to 2.5 mm.

The seat back frame may include a seat back side frame and a seat back member, wherein the seat back member may be formed of a magnesium plate. The seat back member may an upper seat back member, a middle seat back member, or a lower seat back member, wherein thicknesses of the upper seat back member and the lower seat back member may range from 0.8 mm to 1.2 mm, and the middle seat back member may have a thickness of 0.8 mm to 1.0 mm.

The seat cushion frame may include a seat cushion bracket and a seat cushion panel, wherein the seat cushion panel of the seat cushion frame may be formed of a magnesium plate. The seat cushion panel may have a thickness of 1.0 mm to 1.4 mm.

The component formed of a magnesium plate may include a plurality of concave/convex portions provided in a load-bearing direction, wherein the concave/convex portions may be successively arranged in a length direction of the component.

The component formed of a magnesium plate may include at least two parts that have a hollow clam shell shape when assembled.

The at least two parts may constitute the seat back side frame of the seat back frame, wherein each of the at least two parts may have a thickness of 0.8 mm to 1.2 mm.

The vehicle seat structure may further include a recliner connected to the seat cushion frame and the seat back side frame to adjust a seat angle, wherein the seat back side frame may include a connection portion in which penetration holes are formed to receive knobs of the recliner, wherein the seat back side frame has a thickness (t) expressed by the following formula:

$$0.16 \times \frac{L}{L_1^2} \times \frac{1}{t} \times F < 190 \text{ MPa}$$

where L1 denotes a distance between the penetration holes, L denotes a length of the seat back side frame, and F denotes force applied to the seat back side frame.

The vehicle seat structure may further include a recliner connected to the seat cushion frame and the seat back side frame to adjust a seat angle, wherein an inner recliner bracket may be disposed at an inner side of the seat back side frame connected to the recliner, wherein the inner recliner bracket may include a main body connected to the recliner and an extension extending to an upper side of the seat back side frame, wherein the main body of the inner recliner bracket may be connected to the recliner and the extension is connected to the seat back side frame to distribute impact energy transmitted to the seat back frame.

The extension may have a length equal to or less than 1/3 the length of the seat back side frame.

The vehicle seat structure may further include a recliner connected to the seat cushion frame and the seat back side frame to adjust a seat angle, wherein the recliner may be connected to the seat cushion frame through an outer recliner bracket, wherein the outer recliner bracket may include: a deformation control portion formed on a first edge portion that receives a tensile force when being impacted; and another deformation control portion formed on a second edge portion that receives compressive force when impacted, wherein the deformation control portions may convert impact energy into deformation energy.

The deformation control portions may have a protruded or concave shape. The deformation control portion formed on the first edge portion may be greater than the deformation control portion formed on the second edge portion.

The vehicle seat structure may further include a tensile stress absorbing member attached to the seat cushion side frame. The tensile stress absorbing member may include a tensile plate, a tensile rod, or a tensile wire.

The vehicle seat structure may have a second global resonance frequency of 50 Hz or higher.

Advantageous Effects of Invention

As described above, the present invention provides a vehicle seat structure including a component formed of a magnesium plate to remove limitations on a vehicle seat formed by magnesium die casting.

The vehicle seat structure of the present invention is lighter than a steel vehicle seat structure while providing the same function as the steel vehicle seat structure.

In addition, the vehicle seat structure of the present invention can make a user comfortable by rapidly absorbing vibrations generated in a vehicle-moving direction. Furthermore, the vehicle seat structure of the present invention may not be excessively deformed, even in the case that a vehicle collides with another object, so that a user can be safely protected.

In addition, since the vehicle seat structure includes a magnesium plate component and an impact control component attached to the magnesium plate component to absorb or distribute impact energy while being deformed, the vehicle seat structure can be stable and light, and thus high fuel efficiency can be improved.

BRIEF DESCRIPTION OF DRAWINGS

The above and other aspects, features and other advantages of the present invention will be more clearly understood from the following detailed description taken in conjunction with the accompanying drawings, in which.

BEST MODE FOR CARRYING OUT THE INVENTION

Figure 1:
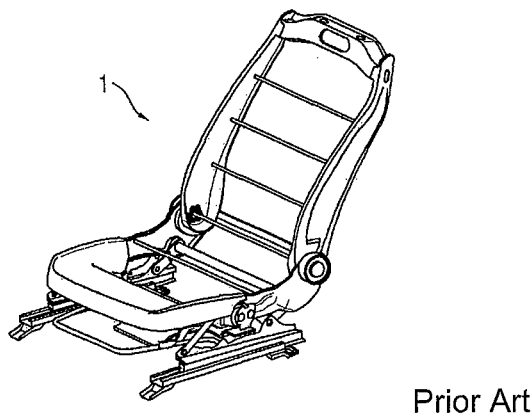
FIG. 1 is a perspective view illustrating a vehicle seat structure formed of steel in the related art.
Figure 2:
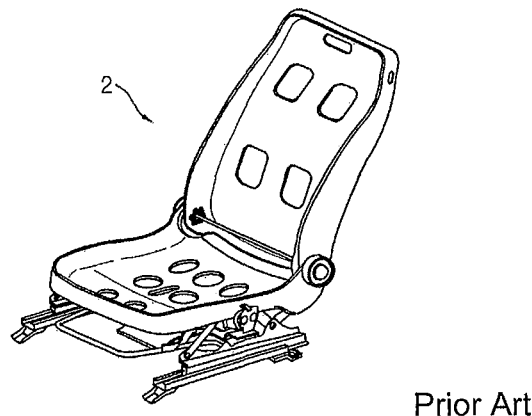
FIG. 2 is a perspective view illustrating a vehicle seat structure formed by die casting using magnesium in the related art.

Generally, heavy and rigid structural components are vulnerable to vibrations, and light and flexible structural components are resistant thereto. However, vehicle seat structures should have sufficient rigidity to protect drivers from traffic accidents. On the other hand, vehicle seat structures should have high vibration resistance to provide convenient and comfortable normal driving conditions.

As described in the Background Art, related art magnesium seat structures formed by die casting cannot sufficiently satisfy weight reduction demands due to the low strength of cast magnesium and internal defects and deviations in casting components.

If a related art steel seat structure is impacted, the steel seat structure absorbs the impact while being deformed. Such a steel seat structure is supported on seat rails through strong link components for preventing excessive deformation of the steel seat structure. However, since cast magnesium has a hexagonal closed packed (HCP) crystal structure, cast magnesium is very difficult to deform at room temperature and is vulnerable to shearing.

However, since magnesium plates have a texture owing to a rolling process, magnesium plates have uniform properties and high tensile strength with favorable deformation ratios, as compared with cast magnesium (please refer to Table 1).

TABLE 1

| Model | Tensile strength (MPa) | Deformation | Shear fracture strength (MPa) |
|---|---|---|---|
| Cast magnesium | 150-180 | <10% | <140 MPa |
| Magnesium plate | 230-300 | ≥18% | ≥190 MPa |

Therefore, if a vehicle seat is manufactured using magnesium plate components, the vehicle seat can be thin, because magnesium plate components do not have internal defects or deviations, unlike cast magnesium. In addition, since magnesium plates may be only slightly deformed in a thickness direction thereof, owing to their texture, lighter vehicle seats can be manufactured using magnesium plates, as compared with the case of manufacturing vehicle seats using cast magnesium in the related art.

However, magnesium plates are less deformable than steel plates. Therefore, in the present invention, impact control components are used as complementary structures for magnesium plates, so that when the magnesium plates are heavily impacted, the impact control components can absorb impacts or distribute impacts to have levels of force lower than the shear fracture strengths of the magnesium plates. As a result, the present invention can provide a vehicle seat structure having the same function as that of a corresponding steel seat frame while being lighter than the steel seat frame.

In the present invention, for example, a concave/convex structure is provided on a seat back side frame as an impact control component; an extension is provided on an inner recliner bracket as an impact control component; a deformation control component is provided on an outer recliner bracket; and a tensile stress absorbing member is provided on a seat cushion bracket.

Furthermore, since the vehicle seat structure is light, owing to the use of a magnesium plate, the vehicle seat structure can have a second global resonance frequency equal to or greater than 50 Hz. Since the second global resonance frequency is inversely proportional to the weight of the vehicle seat structure (dynamic stiffness $\propto \sqrt{(k/m)}$), the second global resonance frequency of the vehicle seat structure can be increased by using a light magnesium plate.

The second global resonance frequency relates to vibrations of a vehicle seat back. If the second global resonance frequency is low, the vehicle seat back is greatly vibrated, and thus, it is difficult to provide a comfortable driving environment. On the other hand, if the second global resonance frequency is 50 Hz or higher, the vehicle seat back is not noticeably vibrated, and thus, a driver may feel comfortable while driving. Generally, vehicle seats are required to have a second global resonance frequency of 30 Hz or higher.

Particularly, like a cantilever, a seat back frame is supported at only one end thereof by a recliner. Therefore, a connection portion of the seat back frame may be easily broken when being impacted. Hereinafter, a seat back frame and a seat cushion frame formed of a magnesium plate, a recliner connection structure, and other frames will be described with reference to the accompanying drawings.

Figure 3:
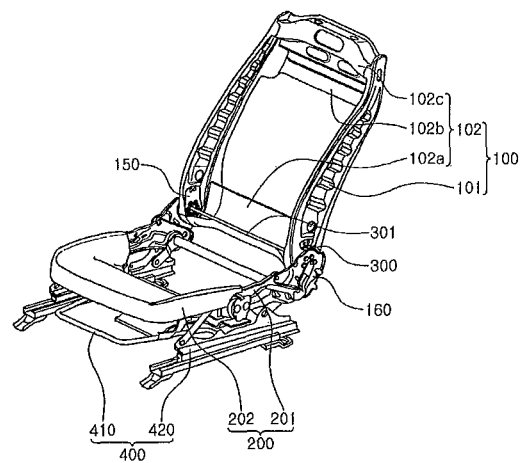
FIG. 3 is a perspective view illustrating a vehicle seat structure including a magnesium plate component according to an embodiment of the present invention.

FIG. 3 is a view illustrating a vehicle seat structure according to an embodiment of the present invention. Referring to FIG. 3, the vehicle seat structure includes a seat back frame 100 and a seat cushion frame 200. The seat back frame 100 includes a pair of seat back side frames 101 and a seat back member 102 connecting the seat back side frames 101. The seat cushion frame 200 includes seat cushion brackets 201 and a seat cushion panel 202. The seat back member 102 includes a lower seat back member 102a, a middle seat back member 102b, and an upper seat back member 102c.

A recliner 300 is disposed between the seat back frame 100 and the seat cushion frame 200 so that the seat back frame 100 can be rotated backwards and forwards. A vehicle support 400 including a pumping structure 410 and a sliding structure 420 is connected to the lower side of the seat cushion frame 200.

Recliner connection portions 105 (refer to FIGS. 4(a) and 4(b)) of the seat back side frames 101 of the seat back frame 100 are connected to the recliner 300, and inner recliner brackets 150 are disposed on the recliner connection portions 105. The seat cushion brackets 201 are connected to the recliner 300 through outer recliner brackets 160. In addition, the seat cushion brackets 201 are connected to the seat cushion panel 202.

In the current embodiment of the present invention, the lower seat back member 102a, the middle seat back member 102b, the upper seat back member 102c, the seat back side frames 101, the seat cushion brackets 201, and the seat cushion panel 202 are formed of magnesium plates.

The lower seat back member 102a may have a thickness of 0.8 mm to 1.2 mm. The middle seat back member 102b may have a thickness of 0.8 mm to 1.0 mm. The upper seat back member 102c may have a thickness of 0.8 mm to 1.2 mm. In this case, the weight of the vehicle seat structure can be reduced, and when the vehicle seat structure is impacted, deformation of the vehicle seat structure can be appropriately limited by the seat back member 102 to protect a passenger.

In addition, the thickness of the seat cushion panel 202 may range from 1.0 mm to 1.4 mm. In this case, the weight of the vehicle seat structure can be reduced, and when the vehicle seat structure is impacted, a passenger may be protected by the seat cushion panel 202 from a deformation caused by the impact.

FIGS. 4(a) and 4(b) are perspective views illustrating the seat back side frame 101 according to an embodiment of the present invention.

Referring to FIGS. 4(a) and 4(b), the seat back side frame 101 is formed of a magnesium plate. The seat back side frame 101 includes a body portion 106 having a predetermined width and extending in a vertical direction of the vehicle seat structure. Both lateral portions and upper and lower portions of the body portion 106 are bent. A plurality of parallel concave/convex portions 110 are arranged in the length direction of the body portion 106. The concave/convex portions 110 are provided in a load-bearing direction in which force is applied to the body portion 106 when the vehicle seat structure is impacted. That is, the concave/convex portions 110 are parallel in a horizontal direction.

The recliner connection portion 105 is located on the lower end of the body portion 106 for connection with the recliner 300. A plurality of penetration holes 104 are formed in the recliner connection portion 105 to receive a shaft 301 and knobs 302 (refer to FIG. 7) of the recliner 300 for fixing the recliner 300. If necessary, one or more additional penetration holes may be formed in the recliner connection portion 105 for attaching additional components.

In addition, coupling holes 120 are formed in an upper portion of the recliner connection portion 105 so that the inner recliner bracket 150 can be coupled to the recliner connection portion 105 through the coupling holes 120.

FIG. 4(c) illustrates exemplary sectional shapes of the concave/convex portions 110. As shown in FIG. 4(c), the concave/convex portions 110 may be rectangular, rhomboid, circular, elliptical, or triangular, according to design requirements.

In the current embodiment, the seat back side frame 101 has a predetermined width, and the concave/convex portions 110 provided in the load-bearing direction are arranged in the length direction of the seat back side frame 101. Therefore, the seat back side frame 101 can resist a buckling load. That is, since the sectional area of the seat back side frame 101 is increased along the concave/convex portions 110, even if a large force is applied to the seat back side frame 101 in the load-bearing direction, the large force can be resisted.

Figure 5:
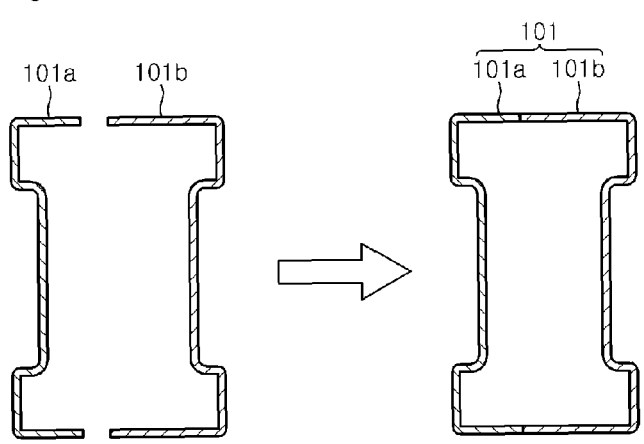
FIG. 5 is a cross-sectional view illustrating a seat back side frame formed of a magnesium plate according to another embodiment of the present invention.

FIG. 5 illustrates a seat back side frame 101 according to another embodiment of the present invention.

Referring to FIG. 5, the seat back side frame 101 includes two parts 101a and 101b, coupled to each other in a clam shell shape. That is, the seat back side frame 101 has a hollow shape. In addition, concave/convex portions 110 (refer to FIGS. 4(a) and 4(b)) provided in a load-bearing direction may be arranged in the length direction of the seat back side frame 101 to increase the load bearing ability of the seat back side frame 101.

Since the seat back side frame 101 has a clam shell shape, a load applied to the seat back side frame 101 can be distributed more effectively and the buckling strength of the seat back side frame 101 can be increased as compared with the seat back side frame 101 illustrated in FIGS. 4(a) and 4(b).

Figure 6:
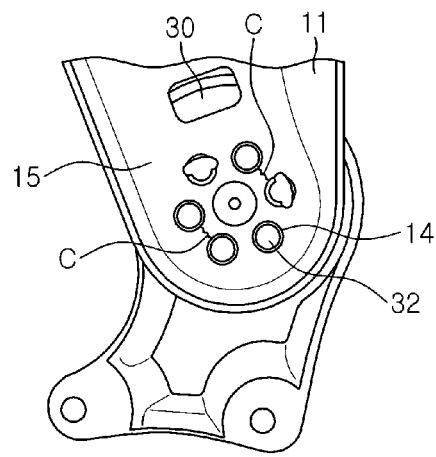
FIG. 6 is view illustrating cracks developed in a connection portion of a recliner connected to a seat back side frame of the related art.

FIG. 6 illustrates a connection state of a seat back side frame 11 and a recliner 30 in the related art. Referring to FIG. 6, due to impacts, cracks (C) may develop in the seat back side frame 11.

Like a cantilever, the seat back side frame 11 is only supported by the recliner 30. Therefore, if an impact is applied to the seat back side frame 11, the impact may be concentrated on regions between penetration holes 14 of a recliner connection portion 15 of the seat back side frame 11 into which knobs 32 of the recliner 30 are inserted. If the seat back side frame 11 is formed of steel, an impact applied to the seat back side frame 11 may be absorbed while the penetration holes 14 are deformed in an elliptical shape. However, if the seat back side frame 11 is formed of magnesium that is not easily deformed, cracks may develop in the seat back side frame 11 since the seat back side frame 11 formed of magnesium cannot absorb an impact.

Therefore, it is necessary to keep the thickness of the magnesium plate of the seat back side frame 101 equal to or greater than a minimum thickness (t), so as to prevent cracks in regions between the penetration holes 104 into which the knobs 302 of the recliner 300 are inserted.

Since the shear fracture strength of the magnesium plate is 190 MPa or higher, when an imaginary line is drawn from a point of one of the penetration holes 104 to a point of a neighboring penetration hole 104 in a load-bearing direction, shearing stress acting between the two points should not be higher than a critical shearing stress.

Figure 7:
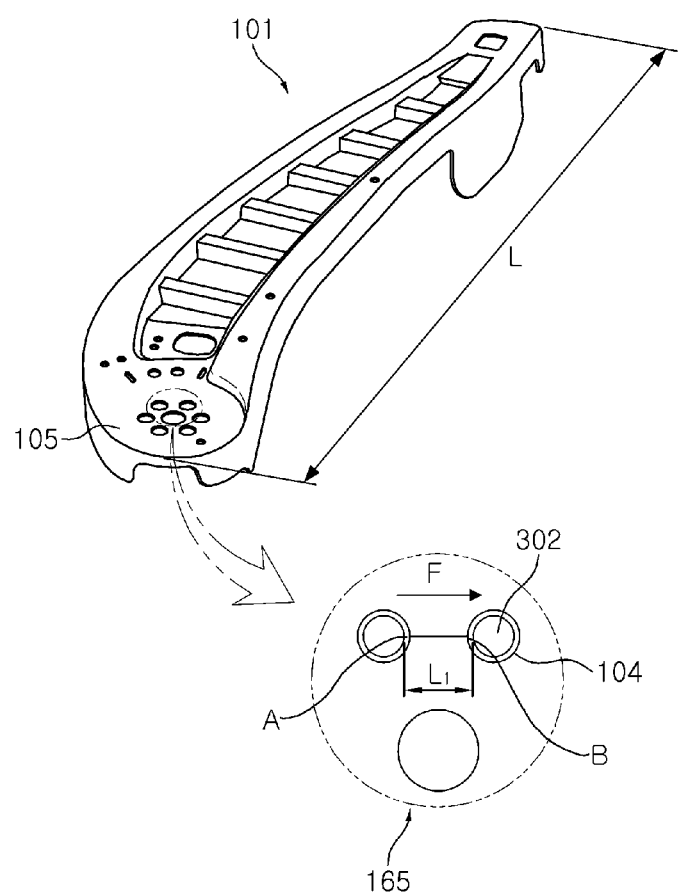
FIG. 7 is a view for explaining force applied to a recliner connection portion of the seat back side frame of the present invention.

Thus, the thickness (t) of the magnesium plate may be determined in consideration of shearing stress acting between two penetration holes 104 and the shear fracture stress (190 MPa) of the magnesium plate as shown by Formula (1) below:

$$0.16 \times \frac{L}{L_1^2} \times \frac{1}{t} \times F < 190 \text{ MPa} \qquad \text{Formula (1)}$$

where L1 denotes the distance between two penetration holes 104, L denotes the length of the seat back side frame 101, F denotes force acting on the seat back side frame 101 (that is, force to be considered in design), and t denotes the thickness of the magnesium plate (refer to FIG. 7).

Figure 4:
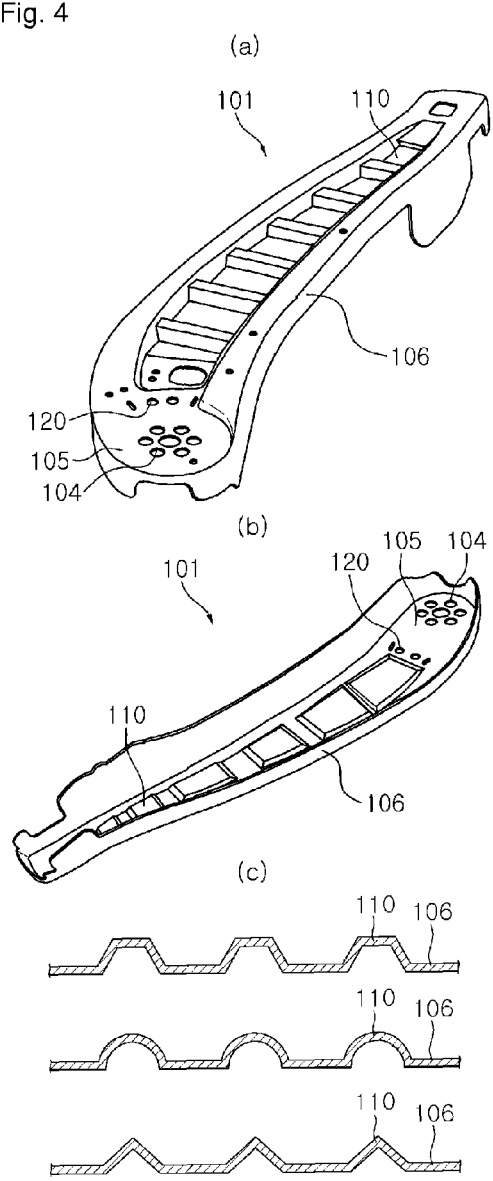
FIGS. 4(a) and 4(b) are a perspective view and a bottom perspective view illustrating a seat back side frame formed of a magnesium plate according to an embodiment of the present invention.
FIG. 4(c) is a cross-sectional view illustrating concave/convex portions of the seat back side frame according to embodiments of the present invention.

Therefore, it may be preferable that the seat back side frame 101 illustrated in FIG. 4 have a thickness of 1.5 mm or greater. If the thickness of the seat back side frame 101 is lower than 1.5 mm, the seat back side frame 101 may buckle, for example, by a traffic accident impact, and thus a passenger may be in danger. If the thickness of the seat back side frame 101 is greater than 2.5 mm, the weight of the vehicle seat structure increases. Thus, it may be preferable that the thickness of the seat back side frame 101 be kept not greater than 2.5 mm.

In the case where the seat back side frame 101 is formed into a hollow clam shell shape by using a magnesium plate, it may be preferable that the thicknesses of the parts 101a and 101b be greater than 0.8 mm. If the thicknesses of the parts 101a and 101b are lower than 0.8 mm, the seat back side frame 101 may buckle, for example, due to a traffic accident impact, and thus a passenger may be in danger. If the thicknesses of the parts 101a and 101b of the seat back side frame 101 are greater than 1.2 mm, the weight of the vehicle seat structure increases. Thus, it may be preferable that the thicknesses of the parts 101a and 101b of the seat back side frame 101 be kept to a thickness not greater than 1.2 mm.

Figure 8:
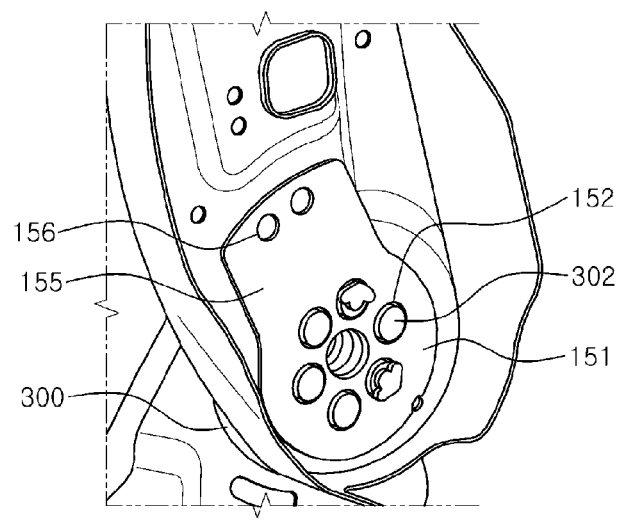
FIG. 8 is a perspective view illustrating an assembled state of the seat back side frame and an inner recliner bracket according to an embodiment of the present invention.

FIG. 8 illustrates an installed state of the inner recliner bracket 150. According to the present invention, in the vehicle seat structure formed of a magnesium plate, the inner recliner bracket 150 is disposed on an inner side of the recliner connection portion 105 of the seat back side frame 101 and coupled to the knobs 302 of the recliner 300 so as to distribute an impact applied to the seat back side frame 101. The inner recliner bracket 150 may be formed of a steel or magnesium plate.

As shown in FIG. 8, the inner recliner bracket 150 includes a main body 151 and an extension 155. Penetration holes 152 are formed through the main body 151 so that the knobs 302 of the recliner 300 can be coupled to or welded to the penetration holes 152. The extension 155 extends from the main body 151 in the length direction of the seat back side frame 101 and makes contact with the inner surface of the seat back side frame 101. Coupling holes 156 are formed in an edge portion of the extension 155 for connection with the seat back side frame 101.

Fasteners such as bolts may be inserted through the coupling holes 156 of the extension 155 and coupling holes 120 (refer to FIG. 9) of the seat back side frame 101, and may be fastened by nuts.

That is, the penetration holes 152 of the main body 151 of the inner recliner bracket 150 are coupled to the knobs 302 of the recliner 300, and the coupling holes 156 of the extension 155 of the inner recliner bracket 150 are coupled to the seat back side frame 101. Therefore, a load applied to the penetration holes 104 of the recliner connection portion 105 of the seat back side frame 101 can be distributed to the coupling holes 156 of the extension 155 of the inner recliner bracket 150.

When force is applied to an upper portion of the seat back frame 100, a bending moment is generated about the center of the recliner connection portion 105. The bending moment is proportional to the amount of force and the distance between the upper portion of the seat back frame 100 and the center of the recliner connection portion 105. Thus, as it moves from the center of the recliner connection portion 105 to the upper portion of the seat back frame 100, stress acting on the seat back frame 100 is reduced. Therefore, if the stress acting on the center of the recliner connection portion 105 is distributed to the coupling holes 156 of the extension 155 of the inner recliner bracket 150, the seat back side frame 101 may be less damaged.

In addition, since the inner recliner bracket 150 makes contact with the inner surface of the seat back side frame 101, the cross sectional area of the seat back side frame 101 is substantially increased by the cross sectional area of the inner recliner bracket 150. When the seat back side frame 101 is impacted, the seat back side frame 101 is generally bent in a region from the center of the recliner connection portion 105 to one-third of the length of the seat back side frame 101. For this reason, the extension 155 of the inner recliner bracket 150 may extend to one-third of the length of the seat back side frame 101.

Figure 9:
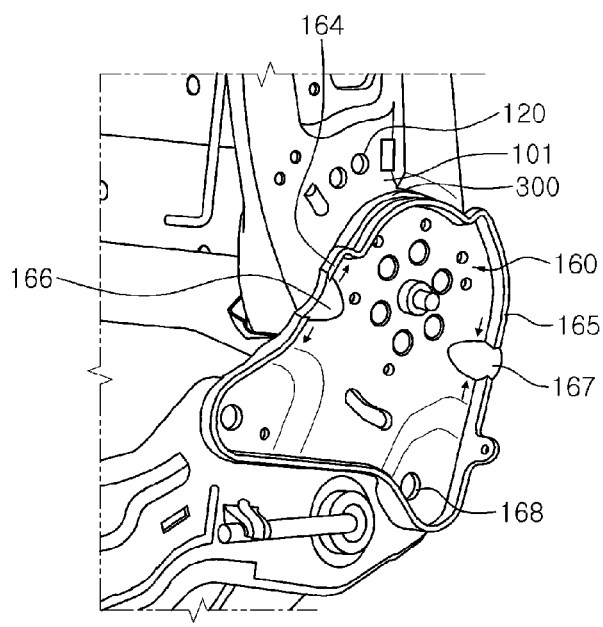
FIG. 9 is a perspective view illustrating an assembled state of a seat cushion bracket and an outer recliner bracket according to an embodiment of the present invention.
Figure 10:
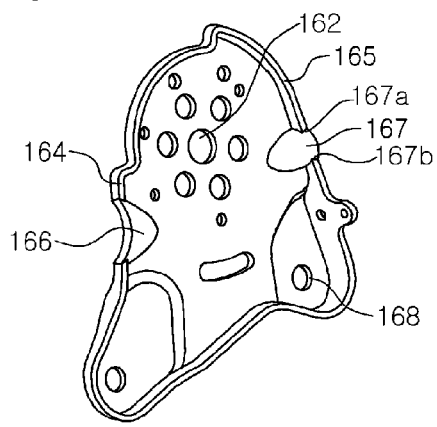
FIG. 10 is a perspective view illustrating the outer recliner bracket according to an embodiment of the present invention.

FIG. 9 illustrates the seat back side frame 101 and the recliner 300 connected to the seat cushion bracket 201 (refer to FIG. 3) through the outer recliner bracket 160, and FIG. 10 is a perspective view illustrating the outer recliner bracket 160.

Referring to FIGS. 9 and 10, penetration holes 162 are formed in a center region of the outer recliner bracket 160 so that the knobs 302 of the recliner 300 can be inserted in the penetration holes 162. A deformation control portion 166 is formed on a front edge portion 164 of the outer recliner bracket 160 facing the front side of the vehicle seat structure, and a deformation control portion 167 is formed on a rear edge portion 165 of the outer recliner bracket 160 facing the rear side of the vehicle seat structure. The outer recliner bracket 160 is formed of a deformable steel material.

For a case in which the vehicle seat structure is severely impacted due to a traffic accident, it is necessary to absorb impact energy by converting the impact energy into deformation energy to prevent components from breaking. As described above, magnesium plates are less deformable than steel plates, although more deformable than cast magnesium plates. Thus, an impact may not be sufficiently absorbed by the deformation of magnesium plate components. However, according to the present invention, the outer recliner bracket 160 can sufficiently absorb an impact while being deformed even in the case that the seat back frame 100 is not deformed. That is, in the present invention, even in the case that the seat back frame 100 or the seat cushion frame 200 is formed of a magnesium plate, the outer recliner bracket 160 can sufficiently absorb impact energy while being deformed.

If an impact is applied to the front side of the vehicle seat structure due to a head-on collision, the front edge portion 164 of the outer recliner bracket 160 receives tensile force, and the rear edge portion 165 of the outer recliner bracket 160 receives compressive force. Then, the deformation control portions 166 and 167 of the front and rear edge portions 164 and 165 may be deformed.

The deformation control portions 166 and 167 are disposed at front and rear sides around the center of shaft 301 of the recliner 300. The (front) deformation control portion 166 has a conical shape or a semicircular protrusion shape so that the front deformation control portion 166 can be stretched by tension. That is, if the vehicle seat structure is impacted, the front deformation control portion 166 may be stretched. After the front deformation control portion 166 is fully stretched, tension is applied to the entirety of the edge of the front deformation control portion 166, and thus the front deformation control portion 166 may function as a support for preventing deformation of the outer recliner bracket 160.

Since the rear deformation control portion 167 receives a compressive force, the deformation control portion 167 has a conical shape or a semicircular protrusion shape deformable by compression. When compressive force is applied to the rear deformation control portion 167, the rear deformation control portion 167 functions as a deformation accommodation space. That is, end of sides 167a and 167b of the deformation control portions get closer. After ends of the sides 167a and 167b of the rear deformation control portion 167 are brought into contact with each other, the rear deformation control portion 167 functions as a support for preventing deformation of the outer recliner bracket 160.

The sizes of the front and rear deformation control portions 166 and 167 can be varied according to the distances from the center of the outer recliner bracket 160 and the amount of impact energy to be absorbed. The front deformation control portion 166 may be torn if excessively stretched, and in this case, the front deformation control portion 166 may not function as a support for preventing deformation of the outer recliner bracket 160. However, the rear deformation control portion 167 may absorb impact energy even in the case that the rear deformation control portion 167 is excessively deformed.

Therefore, if the front deformation control portion 166 is greater than the rear deformation control portion 167, after the front and rear deformation control portions 166 and 167 start to deform to absorb impact energy, the sides of the rear deformation control portion 167 will be brought into contact with each other before the front deformation control portion 166 is torn. In this case, impact energy can be effectively absorbed without a fracture of the front deformation control portion 166.

However, excessive deformation may pose danger to a driver. Therefore, the diameter of the semicircular front deformation control portion 166 may be determined according to the distance (R) from the center of the recliner 300 to the rear edge portion 165. For example, the diameter of the front deformation control portion 166 may be 0.52 or less of the distance (R) for satisfying the requirements of European New car Assessment Programme (Euro NCAP).

As described above, the outer recliner bracket 160 can absorb impact energy while being bent and stretched to reduce stresses acting on the recliner 300 and the seat back frame 100. Specifically, the outer recliner bracket 160 can reduce stress concentrated on the recliner connection portion 105 of the seat back side frame 101. Therefore, the recliner connection portion 105 can be prevented from cracking.

Figure 11:
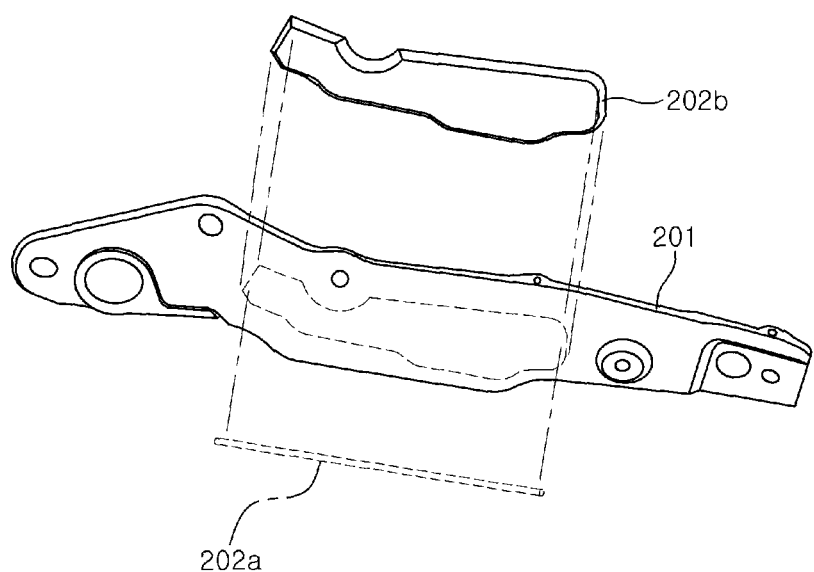
FIG. 11 is a perspective view illustrating the seat cushion bracket according to an embodiment of the present invention.

FIG. 11 is a perspective view illustrating the seat cushion bracket 201 formed of a magnesium plate according to an embodiment of the present invention. The seat cushion bracket 201 is connected to the outer recliner bracket 160 so that impact energy transmitted from the vehicle support 400 to the seat cushion bracket 201 can be distributed to the seat cushion bracket 201. Impact energy transmitted from the vehicle support 400 to the outer recliner bracket 160 through the seat cushion bracket 201 is absorbed while the outer recliner bracket 160 is deformed. If the seat cushion bracket 201 is broken, such impact energy transmission is impossible.

Thus, the seat cushion bracket 201 may be thicker than the seat back side frame 101. For example, the seat cushion bracket 201 may have a thickness of 2.0 mm to 4.0 mm. In this case, deformation of the seat cushion bracket 201 can be prevented while accomplishing the purpose of weight reduction.

As shown in FIG. 11, a tensile stress absorbing member such as a wire member 202a, a plate member 202b, and a pipe may be attached to the inner or outer surface of the seat cushion bracket 201 to reinforce the seat cushion bracket 201.

As described above, according to the present invention, the seat back frame 100 or the seat cushion bracket 201 is formed of a magnesium plate which fractures and breaks while being deformed. Thus, the inner and outer recliner brackets 150 and 160 are used to absorb or distribute an impact by converting impact energy into deformation energy. That is, even in the case that the vehicle seat structure of the present invention is formed using light and stiff magnesium, an impact can be properly absorbed or distributed.

Figure 12:
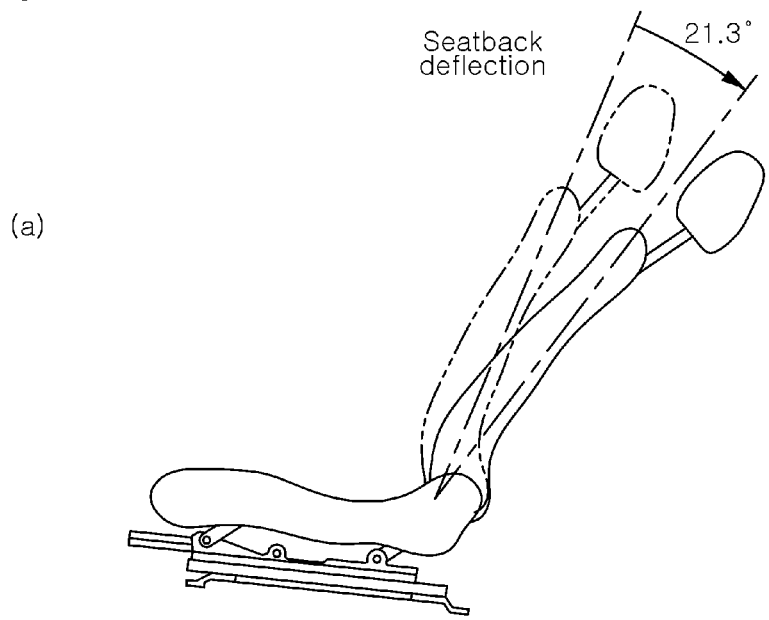
FIGS. 12(a) and 12(b) are views illustrating performance characteristics of a seat of the present invention which are obtained through an experiment carried out under the whiplash conditions of the European New Car Assessment Programme (Euro NCAP).
Figure 12:
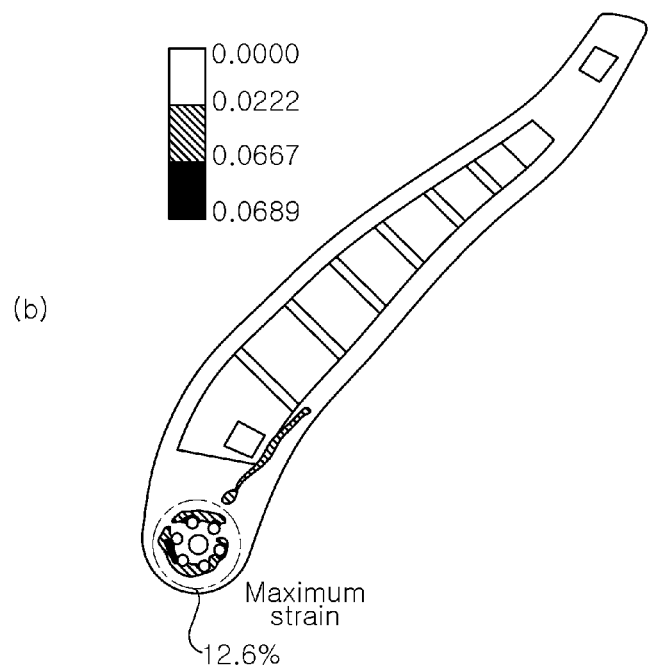

Properties of the vehicle seat structure of the present invention are shown in Table 2 and FIGS. 12(a) and 12(b).

TABLE 2

| Model | Seat back deformation angle | Maximum deformation | Weight | Second global resonance frequency |
|---|---|---|---|---|
| Requirements | <32 | No fracture | — | — |
| Steel seat | 18.7 | 10% | 15-20 kg | 35 Hz |
| Inventive seat | 21.3 | 12.6% | 9-10 kg | 51 Hz |

The Euro NCAP Whiplash Requirements for seat back deformation angle and maximum deformation are shown in the second row of Table 2. Values of Table 2 were measured from the related art steel seat shown in FIG. 1 and the vehicle seat of the present invention shown in FIG. 3. Maximum deformation values were measured in the recliner connection portions of the seat back frames to which the recliners are connected.

Referring to Table 2, the seat back deformation angle and the maximum deformation of the inventive seat satisfy the Euro NCAP Whiplash Requirements.

In addition, even in the case that the weight of the related art steel seat ranges from 15 kg to 20 kg, the weight of the inventive seat ranges from 9 kg to 10 kg. That is, the weight of the inventive seat is about half the weight of the related art steel seat. If it is considered that the weight of a related art seat formed of magnesium by die casting is almost 90% of the weight of a steel seat, it can be understood that the weight reduction effect of the present invention is significant.

Furthermore, even in the case that the second global resonance frequency of the related art steel seat is about 35 Hz, the second global resonance frequency of the inventive seat is 51 Hz. The second global resonance frequency relates to whether a seat back frame resonates or not when a vehicle vibrates. That is, if the second global resonance frequency is low, when a vehicle is operated, a seat back frame may resonate to discomfort a driver. However, if the second global resonance frequency is high like that of the inventive seat, a seat back frame may not resonate, and thus a driver can feel comfortable while driving a vehicle.

In the above-described embodiments, the seat back frame 100 is formed by assembling the seat back side frame 101 and the seat back member 102. However, the seat back frame 100 may be formed as a single piece, or other components may be included in the seat back frame 100.

In addition, the inner and outer recliner brackets 160 may be formed of advanced high strength steel (AHSS) such as twinning induced plasticity (TWIP) steel for high efficiency in impact absorption.

The invention claimed is:

1. A vehicle seat structure comprising:
    a seat cushion frame;
    a seat back frame connected to the seat cushion frame, the seat back frame having a seat back side frame and a seat back member, wherein the seat back side frame is formed of a magnesium plate; and
    a recliner connected to the seat cushion frame and the seat back side frame to adjust a seat angle,
    wherein the recliner is connected to the seat cushion frame through an outer recliner bracket,
    wherein the outer recliner bracket comprises a first deformation control portion formed on a first edge portion that receives a tensile force when impacted and a second deformation control portion formed on a second edge portion that receives compressive force when impacted, and
    wherein the first and second deformation control portions convert impact energy into deformation energy.

2. The vehicle seat structure of claim 1, wherein the seat cushion frame comprises a seat cushion bracket and a seat cushion panel,
    wherein the seat cushion bracket of the seat cushion frame is formed of a magnesium plate and the seat cushion bracket has a thickness of 2.0 mm to 4.0 mm.

3. The vehicle seat structure of claim 2, further comprising a tensile stress absorbing member attached to the seat cushion frame,
    wherein the tensile stress absorbing member comprises a tensile plate, a tensile rod, or a tensile wire.

4. The vehicle seat structure of claim 1, wherein the seat back side frame has a thickness of 1.5 mm to 2.5 mm.

5. The vehicle seat structure of claim 1,
    wherein the seat back member is formed of a magnesium plate,
    wherein the seat back member comprises an upper seat back member, a middle seat back member, and a lower seat back member,
    wherein thicknesses of the upper seat back member and the lower seat back member range from 0.8 mm to 1.2 mm, and
    the middle seat back member has a thickness of 0.8 mm to 1.0 mm.

6. The vehicle seat structure of claim 1, wherein the seat cushion frame comprises a seat cushion bracket and a seat cushion panel,
    wherein the seat cushion panel of the seat cushion frame is formed of a magnesium plate,
    wherein the seat cushion panel has a thickness of 1.0 mm to 1.4 mm.

7. The vehicle seat structure of claim 1, wherein the seat back side frame comprises a plurality of concave/convex portions provided in a load-bearing direction,
    wherein the concave/convex portions are successively arranged in a length direction of the component.

8. The vehicle seat structure of claim 1, wherein the seat back side frame comprises at least two parts that have a hollow clam shell shape when assembled.

9. The vehicle seat structure of claim 1,
    wherein the seat back side frame comprises a connection portion in which penetration holes are formed to receive knobs of the recliner, wherein the seat back side frame has a thickness (t) expressed by the following formula:

$$0.16 \times \frac{L}{L_1^2} \times \frac{1}{t} \times F < 190 \text{ MPa}$$

where L1 denotes a distance between the penetration holes, L denotes a length of the seat back side frame, and F denotes force applied to the seat back side frame.

10. The vehicle seat structure of claim 1,
wherein an inner recliner bracket is disposed at an inner side of the seat, back side frame connected to the recliner,
wherein the inner recliner bracket comprises a main body connected to the recliner and an extension extending to an upper side of the seat back side frame,
wherein the main body of the inner recliner bracket is connected to the recliner and the extension is connected to the seat back side frame to distribute impact energy transmitted to the seat back frame.

11. The vehicle seat structure of claim 1, wherein the first deformation control portion formed on the first edge portion is greater than the second deformation control portion formed on the second edge portion.

12. The vehicle seat structure of claim 1, wherein the vehicle seat structure has a global resonance frequency of 50 Hz or higher.

\* \* \* \* \*

UNITED STATES PATENT AND TRADEMARK OFFICE
CERTIFICATE OF CORRECTION

| | | |
|---|---|---|
| PATENT NO. | : 9,162,595 B2 | Page 1 of 1 |
| APPLICATION NO. | : 13/824411 | |
| DATED | : October 20, 2015 | |
| INVENTOR(S) | : Min-Hong Seo et al. | |

It is certified that error appears in the above-identified patent and that said Letters Patent is hereby corrected as shown below:

IN THE CLAIMS

Column 13, Line 14, Claim 10, delete "seat," and insert -- seat --

Signed and Sealed this
Twenty-ninth Day of March, 2016

Michelle K. Lee
*Director of the United States Patent and Trademark Office*